INVENTOR
SAMUEL S. FOX
BY Jack N. McCarthy
AGENT

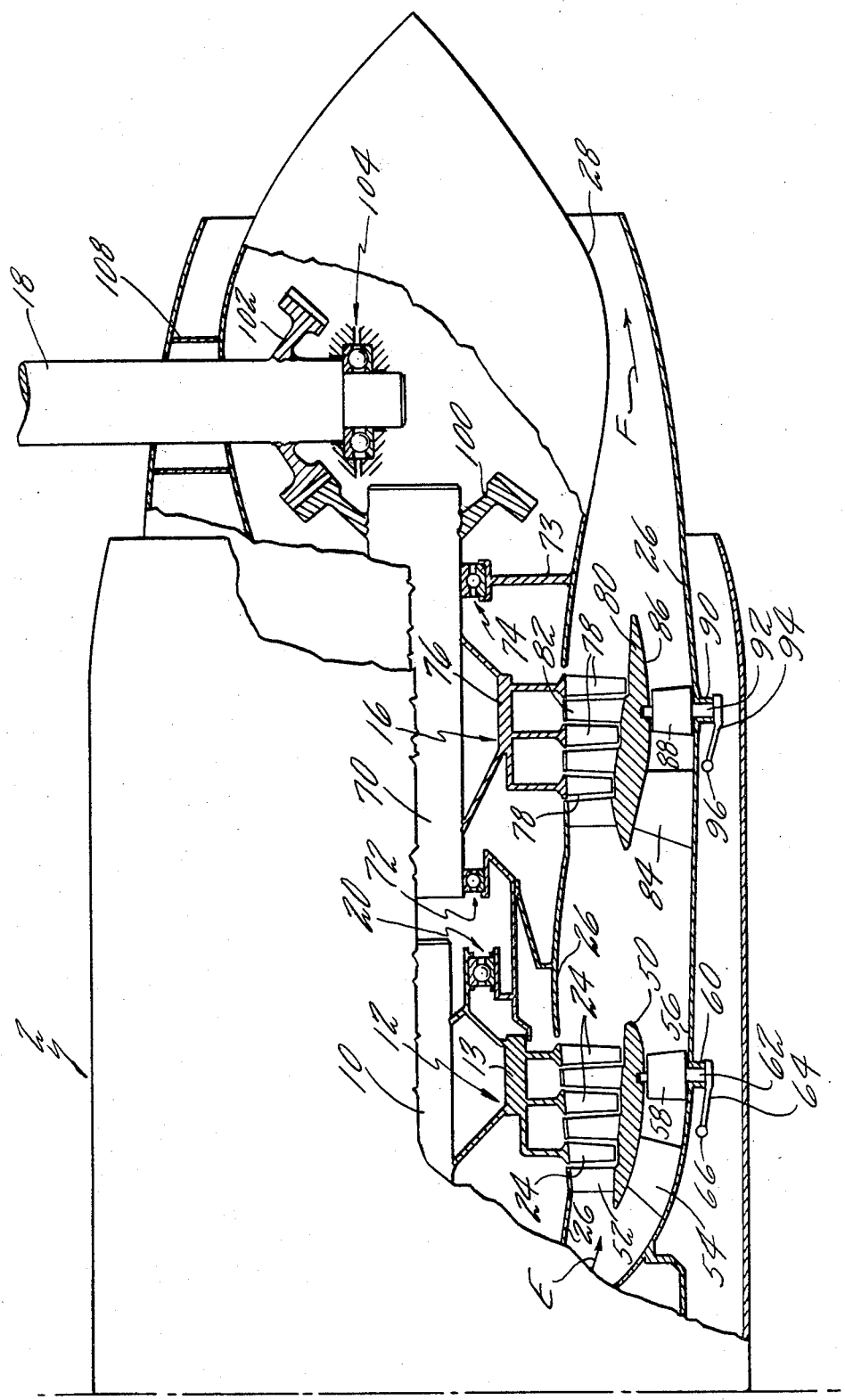

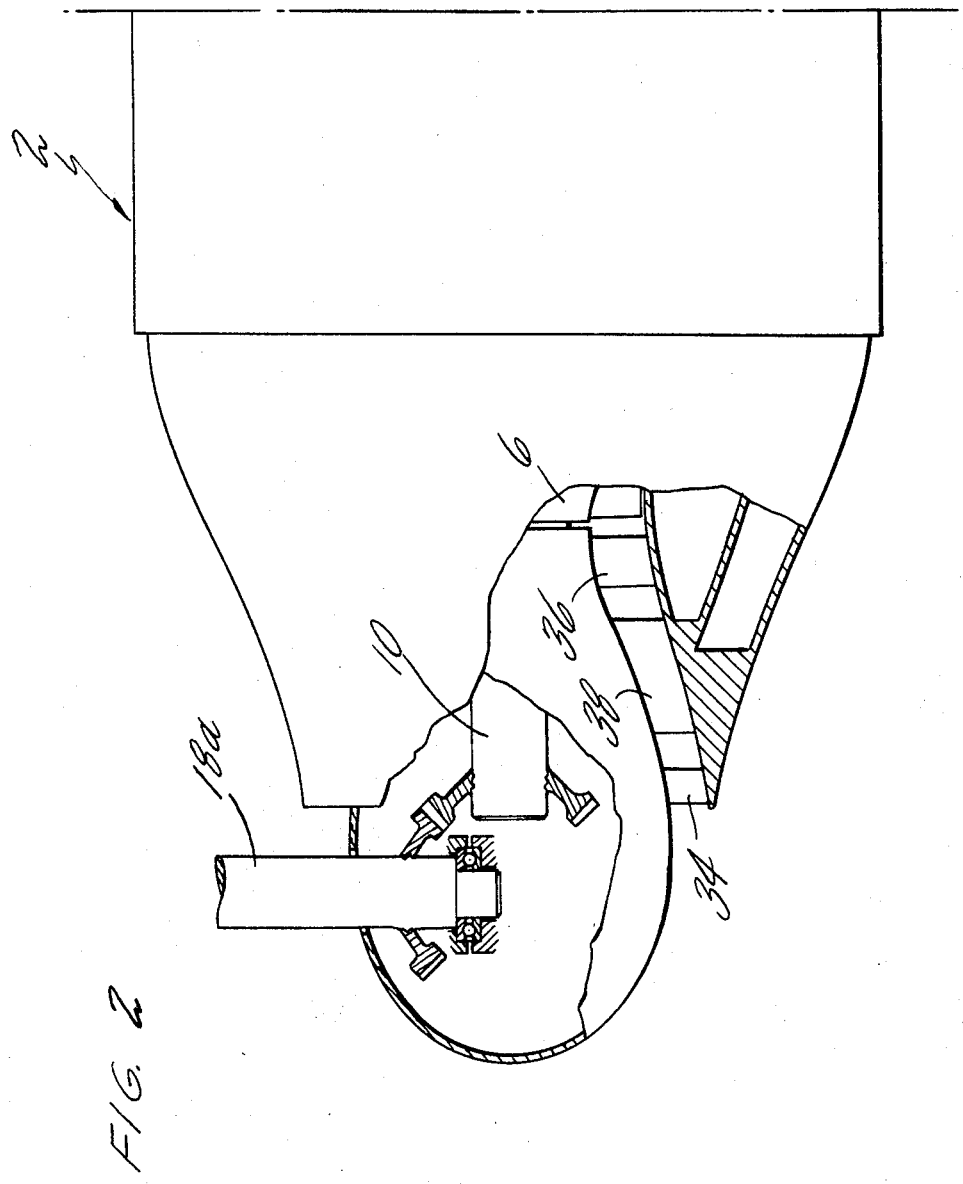

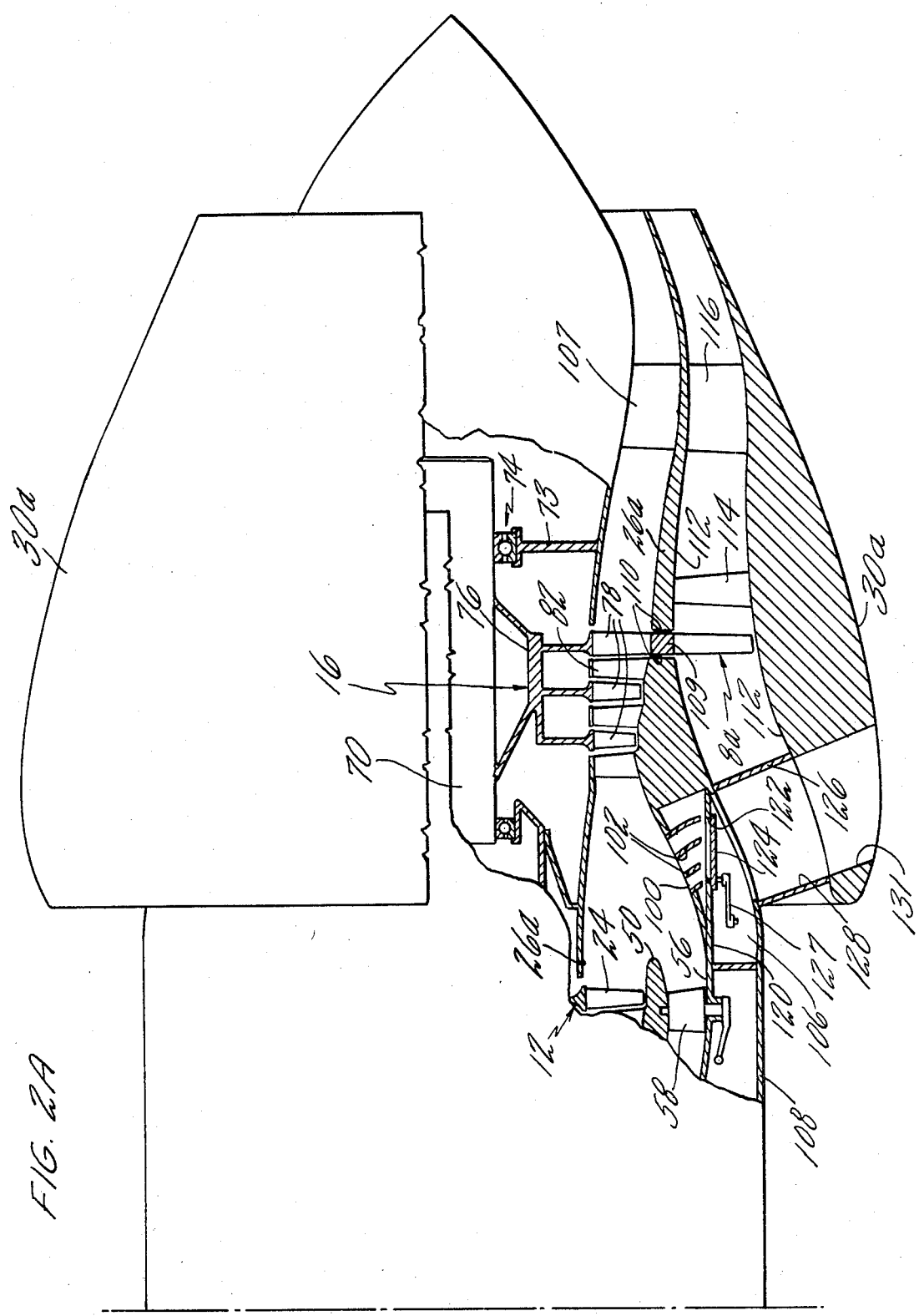

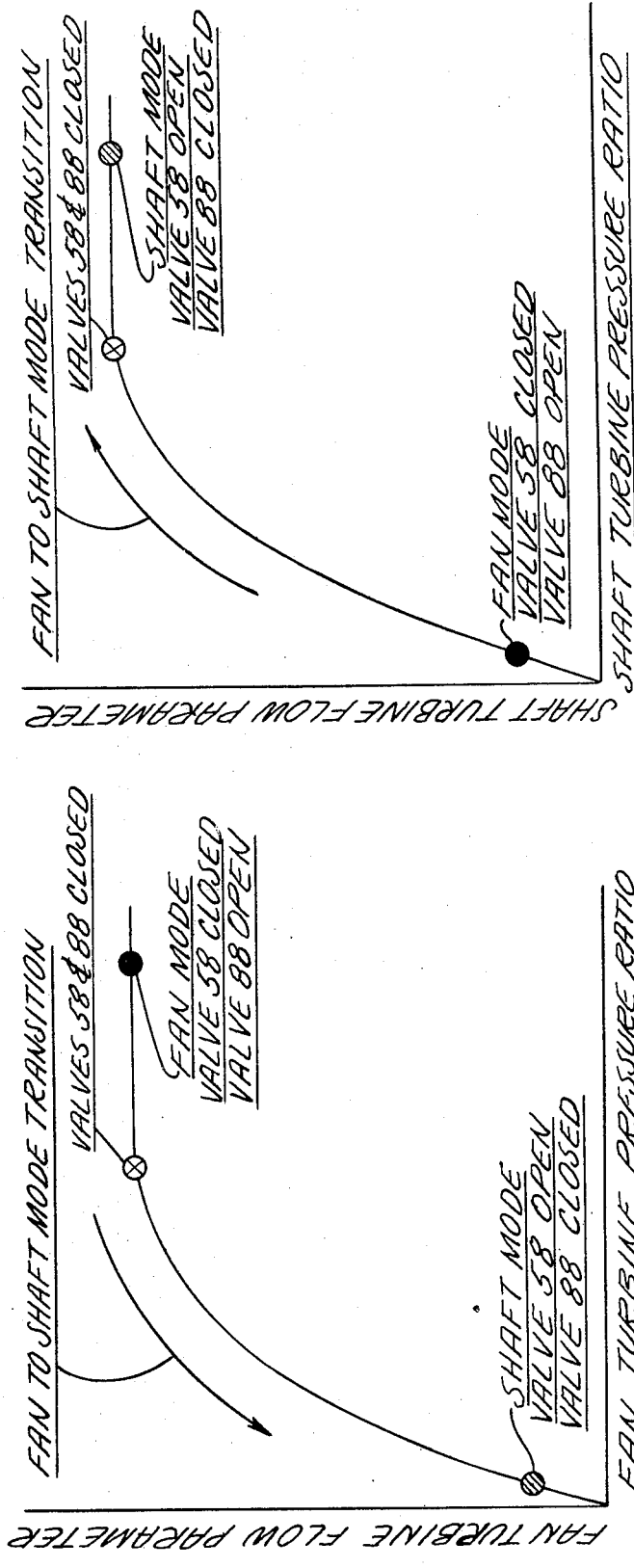

United States Patent Office 3,520,138
Patented July 14, 1970

3,520,138
CONVERTIBLE ENGINE
Samuel S. Fox, Jupiter, Fla., assignor to United Aircraft Corporation, East Hartford, Conn., a corporation of Delaware
Filed Feb. 27, 1969, Ser. No. 802,949
Int. Cl. F02c *3/10;* F02k *3/04*
U.S. Cl. 60—226                                                17 Claims

ABSTRACT OF THE DISCLOSURE

A convertible engine, as disclosed herein, is comprised of three power section combinations. The basic or first power section combination is a hot gas generator and turbine combination including a compressor, a burner, and a first power turbine to drive the compressor. A second power section combination, consisting of a second power turbine with attached shaft, is located downstream of said first turbine of the hot gas generator compressor. A third power section combination, consisting of a third power turbine with attached shaft, is located downstream of said second power section combination. All three power section combinations operate in series with the blades of the second and third power turbines being located in a main annular passageway. Passageways are provided around second and third power turbines with valves disposed therein to progressively open or close the passageways bypassing the second and third power turbines. The second and third power turbine combinations are connected to thrust producing devices in vertical takeoff and landing aircraft but may be connected to any power absorbing devices in general application. In its preferred configuration the shaft of the second power section combination is disposed in a coaxial position within the shaft of the first power section gas generator combination and extending forward to the front of the engine; the shaft of the third power section combination is disposed in a coaxial position with the shaft of the second power section combination but facing in a rearward direction toward the back of the engine assembly.

In its VTOL aircraft application the shaft of the second power section combination may be connected to a fan or propeller, providing horizontal thrust for forward propulsion, and the shaft of the third power section combination may be connected to a helicopter rotor providing vertical thrust or lift. Also, in the alternate configuration the shaft of the second power section configuration may be connected to the helicopter rotor and the shaft of the third power section combination may be connected to a propeller or a fan. If said third power section combination were attached to a fan, a preferred configuration would be to make the fan blades integral with the turbine blades of the last stage of the power turbine, thereby eliminating a power transmission shaft.

The valving means controlling the flow of hot gas through the passageways bypassing the turbines of the second and third power section combinations are operated in the preferred configuration in a sequential manner, but may be operated in any manner providing the desired power output relationship of the second and third power section combinations. The control means actuating said valve means in the bypass passageways may be either manual or automatic.

BACKGROUND OF THE INVENTION

This invention relates to a convertible engine providing a smoothly controllable division of power extraction from the hot gas discharge of a gas generator between two power turbines operating in series configuration without resorting to the use of variable turbine nozzle geometry in the two power turbines. While an engine of this type may be used for many applications requiring two shaft power outputs, one well-known application is that of a power plant for VTOL aircraft employing a helicopter rotor for vertical lift and auxiliary horizontal thrust producing devices for horizontal propulsion.

SUMMARY OF THE INVENTION

A primary objective of this invention is to provide a convertible engine having series turbines driving a fan and power output shaft, whereby gas flow can be diverted around each turbine and vary the pressure ratio across each turbine.

In accordance with the present invention, the control of the vanes, or valves, can bring about efficient transition of the power between the fan and shaft power modes without having to employ variable area nozzles in the turbines.

BRIEF DESCRIPTION OF THE DRAWINGS

FIG. 1A is a view in elevation of the rearward part of the convertible engine partly in section.

FIG. 2 is a view in elevation of the forward part of a modification of a convertible engine partly in section.

FIG. 2A is a view in elevation of the rearward part of a modification of a convertible engine partly in section.

FIG. 3 is a graph showing fan turbine flow parameter plotted against fan turbine pressure ratio.

FIG. 4 is a graph showing shaft turbine flow parameter plotted against shaft turbine pressure ratio.

DESCRIPTION OF THE PREFERRED EMBODIMENT

Figure 1:
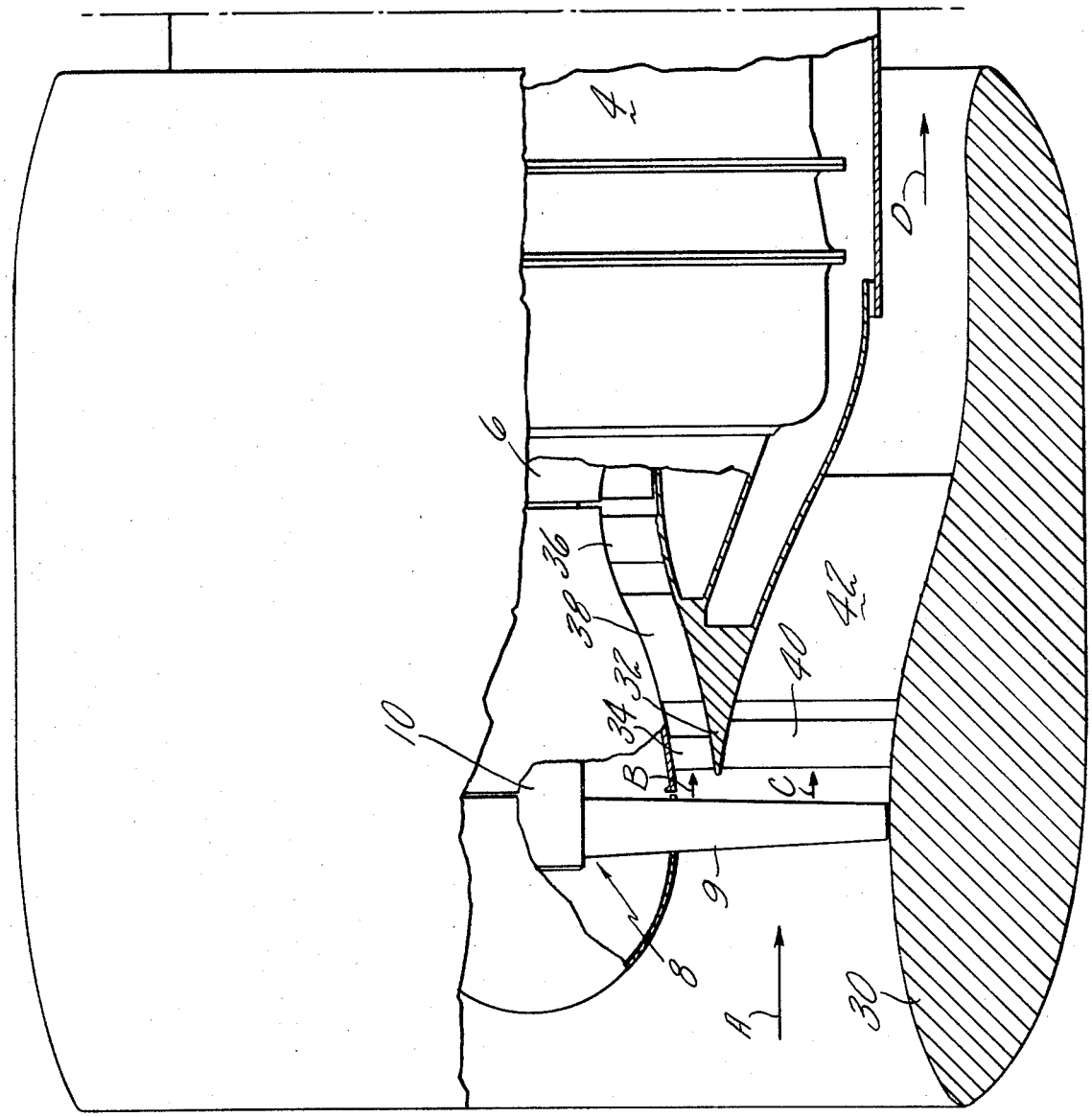
FIG. 1 is a view in elevation of the forward part of the convertible engine partly in section.

Referring to FIGS. 1 and 1A, a convertible engine 2 includes three main power sections. These sections are (1) a gas generator and turbine combination 4, (2) a fan 8 and turbine 12 combination, and (3) an output shaft 18 and turbine 16 combination.

The gas generator and turbine combination 4 can be one of many well known designs. In the combination shown the generator inludes an air compressor 6 drivingly connected to a turbine means with a combustion system therebetween. A basic compressor, burner, and turbine combination such as referred to is shown in U.S. Pat. No. 3,269,114. In this combination the compressor can be centrifugal, or axial, and the number of turbine stages can vary. This is mentioned to indicate how details can be altered yet not affect the basic combination. The gases leaving the turbine means is shown by arrow E.

The fan 8 and turbine 12 combination has the fan 8 located upstream of the compresser 6 and fixed to a shaft 10 which extends through the gas generator turbine combination 4 to the turbine 12, which is located downstream of the exhaust gases E leaving the turbine combination 4.

The fan 8 has its blades 9 surrounded by a fan duct 30 to provide for flow around the gas generator and turbine combination 4 and the output shaft 18 and turbine 16 combination. A splitter vane 32 located immediately downstream of the blades 9 of said fan 8 to divide the inlet flow between the compressor 6 and that which is bypassed. Vanes 34 and 36 are located between the inner side of the splitter vane 32 and the fixed part of the center hub of the engine to give proper direction of flow to the compressor 6. The vanes 34 are adjacent the blades 9 and the vanes 36 are adjacent the inlet of the compressor 6. Struts 38 provide the main structural support. Vanes 40 are positioned immediately downstream of the blades 9 of fan 8 between the outer side of the annular splitter vane and the inner side of the fan duct 30. A plurality of struts 42 provide the main structural support for the fan duct. The inlet flow from the exterior of the engine into the blades 9 of the fan 8 is shown by arrow A. The flow leaving the fan is shown divided into two parts; these are shown by the arrow B which enters the passageway into the compressor 6 and the arrow C which passes over the vanes 40 and is exhausted through the annular bypass passageway formed by the fan duct 30 and the continuation of the splitter vane. The exhaust from the bypass is represented by arrow D. This fan 8 and turbine 12 combination is also basically shown in the U.S. patent referred to above.

The front end of the shaft 10 is mounted in bearing means in the fixed part of the center hub (not shown) and the rear end of the shaft is mounted in bearing means 20 which are fixed within a structural support 22 within the engine. A movable part of the center hub is fixedly attached to the shaft. The turbine 12 comprises a rotor 13 fixed to the shaft and having three stages of turbine 24 extending therefrom. Three blades 24 project into an annular passageway 26 which extends from the exit of the turbine means of the gas generator and turbine combination 4 to where it exhausts through the nozzle section 28 at the rear of the engine. This flow is shown exhausting through the nozzle section by the arrow F.

An annular shroud member 50 is positioned around the tips of the blades 24 of the turbine 12 and is supported by vanes 52 located upstream of the first turbine stage, between the first and second stages, and between the second and third stages. A plurality of struts 54 also extend between the outer surface of the shroud member 50 and the inner side of the annular passageway 26. These struts are located at the forward part of the shroud.

In the passageway 56 formed by the outer annular surface of the shroud 50 and the inner surface of the annular passageway 26, a plurality of movable vane, or valve, members 58 are positioned to move between a fully open position, as shown, wherein flow through passageway 56 is virtually unobstructed, and a fully closed position 90° therefrom wherein flow through the passageway 56 is prevented. Each of the vane, or valve, member is pivotally mounted at its inner end in the shroud member 50 and pivotally mounted at its outer end in a boss 60 positioned in the outer wall of the passageway 56. A shaft member 62 extends through each boss 60 and has a bell crank level 64 attached thereto. The free ends of the bell crank lever 64 are all attached to an annular ring means 66 which can be moved to operate a movable vane, or valve, members simultaneously. The output shaft 18 and turbine 16 combination has the turbine 16 located downstream of the turbine 12 and fixed to a shaft 70 which is located axially in line with shaft 10 and mounted for rotation in bearing means 72 and 74 which are fixed in a structural support 22 and a structural support 73 within the engine. The turbine 16 comprises a rotor 76 fixed to the shaft 70 and having three stages of turbine blades 78 extending therefrom. These blades 78 project into annular passageway 26. An annular shroud member 80 is positioned around the tips of the blades 78 of the turbine 16 and is supported by vanes 82 located upstream of the first turbine stage, between the first and second stages, and between the second and third stages. A plurality of struts 84 also extend between the outer surface of the shroud member 80 and the inner side of the annular passageway 26. These structs are located at the forward part of the shroud.

In the passageway 86 formed by the outer annular surface of the shroud 80 and the inner surface of the annular passageway 26, a plurality of movable vane, or valve, members 88 are positioned to move between a fully open position, as shown, wherein flow through passageway 86 is virtually unobstructed, to a fully closed position 90° therefrom wherein flow through the passageway is prevented. Each of the vane, or valve, members is pivotally mounted at its inner end in the shroud member 80 and pivotally mounted at its outer end in a boss 90 positioned in the outer wall of the passageway 86. A shaft member 92 extends through each boss 90 and has a bell crank lever 94 are all attached to an annular ring means 96 which can be moved to operate the movable vane, or valve, members simultaneously.

The rear end of the shaft 70 has a bevel gear 100 fixed thereto which engages a bevel gear 102 which is fixed to the bottom of output shaft 18. Output shaft 18 is mounted for rotation in the bearing unit 104 positioned within the engine and an upper bearing unit not shown. The shaft 18 can be used to drive any type of mechanism desired, such as a helicopter rotor. The output shaft 18 extends through one of a plurality of struts 108 structurally connecting the casing forming the outer part of the passageway 26 and the center plug forming the inner wall of the passageway 26.

The convertible engine having turbine driven fan 8 and a turbine driven shaft 18 incorporates series power turbines 12 and 16, respectively, with bypass vanes, or valves, 58 and 88, respectively, to divert gas flow around each turbine and thereby vary the pressure ratio across each turbine. This construction permits smooth efficient transition of power between the fan and shaft power modes without having to employ variable area nozzles in the power turbines. For full fan thrust vanes, or valves, 58 are fully closed and valves 88 are fully open. The total power turbine expansion ratio is thereby placed across the fan turbine 12. When both fan thrust and shaft power are desired, the bypass valves 88 are progressively closed which divides the pressure ratio between the fan turbine 12 and the shaft turbine 16. After bypass vanes, or valves, 88 are fully closed, bypass vanes, or valves, 58 can be progressively opened to further increase the pressure ratio across the shaft power turbine and decrease the pressure ratio across the fan turbine until vanes, or valves, 58 are fully opened, at which point the fan thrust will be essentially zero and the full power will be produced by the shaft turbine 16.

Referring to FIGS. 2 and 2A, the convertible engine 2 includes three main power sections as did the engine shown in FIGS. 1 and 1A; however, the turbine 12 in this modification drives a shaft 18a through the shaft 10 instead of the fan 8. The turbine 16 on the shaft 70 drives a fan 8a. This fan 8a is shown fixedly positioned around the outer edge of the last stage of the turbine means 16. An outer fan duct 30a surrounds the blades of the fan 8a to provide for flow around the turbine 16. The duct 30 is omitted leaving just the inlet to the compressor 6.

In this modification the main annular duct 26a has a converging section aft of the annular shroud member 50 to direct flow only into the vanes 82 and blades 78 of the turbine means 16. Opening means 100 located about the periphery of the outer wall of the converging section has turning vanes 102 to aid in redirecting the flow entering into an annular chamber 106. This chamber is formed between the outer wall of the converging section and the outer casing 108. At this point the outer casing 108 is contoured to form the inner surface of the passageway 112 formed with fan duct 30a. Aft of the chamber 106 the converging outer wall and casing wall are supported by the vanes 82. For further support, struts 107 are located downstream of the last turbine stage.

A seal means 110 is located on each side of the annular connecting separator 109. The separator 109 connects the blade tips of the turbine 16 and roots of the blades of the fan 8a. The outer wall of the passageway 26a and the inner wall of the passageway 112 extend rearwardly from the annular connecting separator and are supported by a plurality of struts 116. Vanes 114 are located downstream of the fan 8a.

Annular chamber 106 has a cylindrical member 120 extending therethrough. This cylindrical member 120 has opening means 122 extending therearound for permitting flow to pass from the inner side of the chamber to the outer side. The opening means has valve means 124 which comprises a solid cylindrical member slidably mounted over the cylindrical member 120. Actuating means 127 provides for movement of the member 124 forwardly and rearwardly over the opening means 122. The outer part of the chamber 106 is connected at a plurality of locations about the periphery of the casing through struts 126 and duct 30a to the exterior of the engine. Each strut 126 has a pasageway 128, and the fan duct 30a has a passageway extension 131 for each passageway 128.

When valve member 124 is positioned in its rearward position, flow into the converging section is prevented from flowing through opening means 122. As the valve member is moved forwardly, the opening means 122 is uncovered thereby opening the opening means and permitting flow into the outer side of said chamber 106 and through struts 126 and passageway extension 131, thus bypassing the turbine blades 78.

FIG. 3 shows the fan turbine flow parameter $$\frac{W_{ft}\sqrt{T_{T_{ft}}}}{A_{ft}P_{T_{ft}}}$$

plotted against the fan turbine pressure ratio $P_{T_{ft}}/P_{T_{st}}$ and FIG. 4 shows shaft turbine flow parameter $$\frac{W_{st}\sqrt{T_{T_{st}}}}{A_{st}P_{T_{st}}}$$

plotted against the shaft turbine pressure ratio $P_{T_{st}}/P_{amb}$ to illustrate the transition operation between the fan mode and shaft mode of the front fan and rear shaft engine.

The symbols used above are identified below:

$W_{ft}$—gas flow through fan turbine
$T_{T_{ft}}$—stagnation temperature ahead of fan turbine
$P_{T_{ft}}$—stagnation pressure ahead of fan turbine
$A_{ft}$—effective flow area of fan turbine nozzle
$P_{T_{st}}$—stagnation pressure ahead of shaft turbine
$W_{st}$—gas flow through shaft turbine
$T_{T_{st}}$—stagnation temperature ahead of shaft turbine
$A_{st}$—effective flow area of shaft turbine nozzle
$P_{amb}$—ambient pressure.

In FIG. 3 it can be seen that in transition, as the convertible engine moves from the fan mode of operation, where the valve 58 is closed and valve 88 is fully open, to the shaft mode of operation, where the valve 58 is fully open and the valve 88 is closed, the curve moves first to the left to a point where both valves 58 and 88 are closed. As seen in FIG. 4, during this time, the curve moves upwardly to the right increasing the shaft turbine flow parameter and shaft turbine pressure ratio to the point where both valve 58 and 88 are closed.

As the transition from fan mode to shaft mode continues, in FIG. 3, the curve then moves downwardly and to the left to the point where the valve 58 is fully open and the valve 88 is closed, placing the engine in shaft mode. As seen in FIG. 4, during this time, the curve moves to the right to the point where valve 58 is fully open and the valve 88 is closed. The operation of transition from shaft mode to fan mode reverses the procedure set forth above. The curves for operation between the fan mode and shaft mode of the rear fan and front shaft engine are similar.

I claim:

1. A convertible engine having in combination,
    (a) a first gas generator having a compressor, burner and first turbine means for driving said compressor,
    (b) an annular passageway extending from said first turbine means for receiving gas therefrom,
    (c) second turbine means having turbine blades located in said annular passageway,
    (d) a drive shaft extending through said first gas generator,
    (e) said second turbine means being drivingly connected to one end of said drive shaft,
    (f) a first thrust producing device being connected to the other end of said drive shaft,
    (g) third turbine means having turbine blades located in said annular passageway downstream of said turbine blades of said second turbine means,
    (h) said third turbine means being drivingly connected to a second thrust producing device,
    (i) first conduit means having an inlet connected to said annular passageway upstream of the blades of said second turbine means for directing flow from said annular passageway without passing through said blades of said second turbine means back to said annular passageway between said blades of said second turbine means and said blades of said third turbine means,
    (j) second conduit means having an inlet connected to said annular passageway between said blades of said second turbine means and said blades of said third turbine means for directing flow from said passageway to exhaust without passing through said blades of said third turbine means.

2. A combination as set forth in claim 1 wherein;
    (k) said first conduit means having valve means for controlling the flow therethrough.

3. A combination as set forth in claim 1 wherein;
    (k) said second conduit means having valve means for controlling the flow therethrough.

4. A combination as set forth in claim 1 wherein;
    (k) said first and second conduit means having valve means for controlling the flow therethrough.

5. A combination as set forth in claim 4 wherein;
    (l) said first conduit means being formed by an annular shroud located in said annular passageway around the first turbine blades.

6. A combination as set forth in claim 5 wherein;
    (m) one of said thrust producing devices is a ducted fan.

7. A combination as set forth in claim 1 wherein;
    (k) said second conduit means being formed by an annular shroud located in said annular passageway around the second turbine blades.

8. A combination as set forth in claim 1 wherein;
    (k) said second conduit means being formed by a passageway extending from said annular passageway to a location outside of said annular passageway.

9. A convertible engine having in combination,
    (a) a first power section having a compressor, a burner and first turbine means for driving said compressor,
    (b) an annular passageway extending from said first turbine means,
    (c) second turbine means having turbine blades located in said annular passageway,
    (d) a fan located so as to direct air into said compressor,
    (e) an annular duct located around said engine,
    (f) said fan also directing air into said annular duct,
    (g) said second turbine means being drivingly connected to said fan,
    (h) third turbine means having turbine blades located in said annular passageway,
    (i) an output shaft extending from said engine,
    (j) said third turbine means being drivingly connected to said output shaft,
    (k) first means cooperating with said annular passageway for bypassing flow around the turbine blades of said second turbine means to the turbine blades of the third turbine means,
    (l) second means cooperating with said annular passageway for bypassing flow around the blades of said third turbine means to exhaust.

10. A combination as set forth in claim 9 wherein;
    (m) said first means includes an annular shroud located in said annular passageway dividing a portion of said annular passagweay into an inner and outer annular passageway,
    (n) said shroud being located around the blades of said second turbine means in that the blades are in said inner annular passageway.

11. A combination as set forth in claim 10 wherein;
(o) said first means including valve means for bypass control located in said outer annular passageway.

12. A combination as set forth in claim 9 wherein;
(m) said second means includes an annular shroud located in said annular passageway dividing a portion of said annular passageway into an inner and outer annular passageway,
(n) said shroud being located around the blades of said third turbine means so that the blades are in said inner annular passageway.

13. A combination as set forth in claim 12 wherein;
(o) said second means including second valve means for bypass control located in said outer annular passageway.

14. A combination as set forth in claim 9 wherein;
(m) said first means includes a first annular shroud located in said annular passageway dividing a portion of said annular passageway into a first inner and first outer annular passageway,
(n) said first annular shroud being located around the blades of said second turbine means so that the blades are in said first inner annular passageway,
(o) said second means includes a second annular shroud in said annular passageway dividing a second portion of said annular passageway into a second inner and a second outer annular passageway,
(p) said second annular shroud being located around the blades of said third turbine means so that the blades are in said second inner annular passageway.

15. A combination as set forth in claim 14 wherein;
(q) said first means including first valve means for bypass control located in said first outer annular passageway,
(r) said second means including second valve means for bypass control located in said second outer annular passageway.

16. A combination as set forth in claim 1 wherein;
(k) said second thrust producing device is a fan mounted at the rear of the engine.

17. A combination as set forth in claim 16 wherein;
(l) said fan is formed on the third turbine means.

References Cited

UNITED STATES PATENTS

| | | | |
|---|---|---|---|
| 3,375,996 | 4/1968 | Wilde | 60—226 |
| 3,449,914 | 6/1969 | Brown | 60—39.16 |
| 3,465,526 | 9/1969 | Emerick | 60—226 |
| 3,472,487 | 10/1969 | Moellmann | 60—39.16 |

FOREIGN PATENTS 1,001,624  8/1965  Great Britain.

DOUGLAS HART, Primary Examiner

U.S. Cl. X.R.

60—39.16